May 3, 1966  R. E. VOSTEEN  3,249,833
CAPACITOR TRANSDUCER
Original Filed Oct. 31, 1960  2 Sheets-Sheet 1

INVENTOR.
ROBERT E. VOSTEEN
BY
Irons, Birch, Swindler & McKie
ATTORNEYS

May 3, 1966  R. E. VOSTEEN  3,249,833
CAPACITOR TRANSDUCER

Original Filed Oct. 31, 1960  2 Sheets-Sheet 2

INVENTOR
ROBERT E. VOSTEEN

BY *Irons, Burch, Swindler, & McKee*

ATTORNEYS

United States Patent Office

3,249,833
Patented May 3, 1966

1

3,249,833
CAPACITOR TRANSDUCER
Robert E. Vosteen, 5 Vernon St., Middleport, N.Y.
Continuation of application Ser. No. 66,274, Oct. 31, 1960. This application Nov. 16, 1964, Ser. No. 411,642
6 Claims. (Cl. 317—246)

This application is a continuation of my copending application Serial No. 66,274, filed October 31, 1960, now abandoned.

This invention relates to an improved capacitor transducer device, and more particularly, to such a device having particular application in the measuring field, such as in measurement of a non-electrical property by electrical means.

This invention meets a long-felt requirement for a single capacitor device which is simple, structurally sound, and adaptable to a plurality of useful purposes, such as measuring, detecting, and signalling, as, for example, in telemetering. The structure of the capacitor device includes a metallic foil disposed parallel to and between a pair of metal plates, thereby forming a pair of capacitors, so that change in position of the foil relative to the two plates can be utilized to derive a desired indication of a given parameter. Among the applications of the device is its use as a means for electrically detecting and measuring a change in pressure. In this application, it is possible to subject opposite sides of the foil to different pressures, thereby causing displacement of the foil toward one or the other of the capacitor plates. The change in capacities can thus be detected by an appropriate circuit, whereby the change in pressure can be detected or measured. A problem arises with this arrangement, however, in that deformation of the foil resulting from the differential pressure can be permanent. This phenomena may be likened to "canning," or the deformation of the ends of a can due to differential pressures within and without the can. In the novel structure of this improved transducer, this problem is met and the undesirable "canning" is eliminated. A still further problem, in structure of the type represented by this transducer, is the effect of heat variation between the component parts, often resulting in deleterious effects upon the accurate performance of the device. This problem is also met by the teaching of this invention.

Within the circuitry of a suitable environment for the novel transducer of this invention there is provided a transformer having the secondary winding thereof forming impedance elements of a bridge circuit. In this arrangement, a high distributed capacitance exits between the finish of the primary winding and the start of the secondary winding relative to the distributed capacitance between the start of the primary winding and the finish of the secondary winding. This problem is also met within the teaching of this invention by a novel capacitance balance adjustment. Within the same circuitry, another problem exists due to leakage between the primary and secondary windings or any leakage to ground, this leakage resulting in an undesirable quadrature component of unbalance in the bridge circuit. This problem is also met within the teaching of this invention by a novel resistance balance control.

The object of this invention is to provide an improved capacitor transducer device.

Another object is to provide an improved capacitor device utilizing a thin metallic foil disposed parallel to and between capacitive plates whereby a differential capacitance may be obtained.

Another object of this invention is to provide an improved capacitor device which may be subjected to a differential force and which may be readily utilized in a plurality of applications.

A still further object of the invention is to provide an improved differential capacitance transducer for electrically measuring non-electric properties.

Further objects, features, and attendant advantages of the invention will become apparent by reference to the following specification and drawings, in which.

Figure 1:
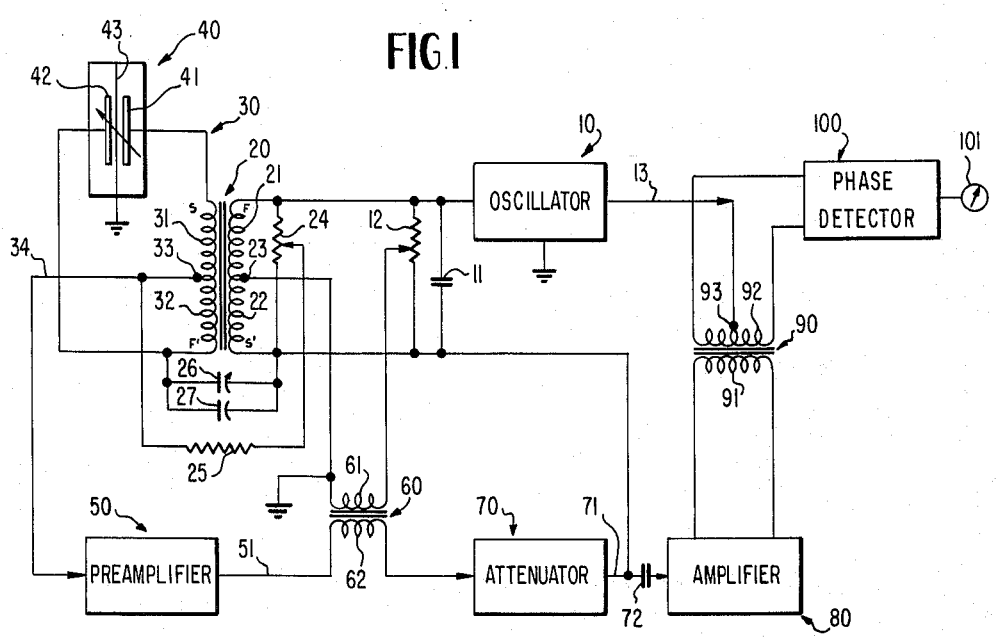
FIG. 1 is a schematic diagram of a detecting and measuring circuit embodying various features of the invention.

With reference to FIG. 1, there is shown at 10 a source of high frequency electrical energy. In the preferred embodiment of this circuit, this is an oscillator of suitable type. The output voltage from oscillator 10 is applied across half of the primary winding of a transformer generally indicated at 20, and the entire primary is shunted by a tuning capacitor 11. A first portion 22 of the primary winding of transformer 20 extends between the "start" S' and a center tap 23, while a second portion 21 extends between center tap 23 and the "finish" F. A first portion 31 of the secondary of transformer 20 extends between the "start" S and a center tap 33, while a second portion 32 of the secondary extends between center tap 33 and the "finish" F'.

A capacitor device, generally indicated at 40 has opposed capacitor plates 41 and 32. A thin, flexible metallic foil 43 is mounted parallel to and between plates 41 and 42. Foil 43 is grounded. A Wheatstone bridge circuit, generally indicated at 30, incorporates the secondary of transformer 20 and the capacitance transducer 40. Specifically, the bridge comprises portion 31 of the secondary of transformer 20, and in series therewith, the capacitance existing between plate 41 of transducer 40 and the metallic foil 43. In parallel with this leg is the second portion 32 of the secondary of transformer 20 and, in series therewith, the capacitance formed by plate 42 and the foil 43. Since the foil 43 is grounded, it will be apparent that the output voltage of the bridge will appear between center tap 33 and ground. A wire 34 connects center tap 33 to a pre-amplifier, generally indicated at 50. The output side of pre-amplifier 50 is connected by a wire 51 to an attenuator, generally indicated at 70. Wire 51 includes the secondary 62 of a transformer generally indicated at 60. The primary 61 of transformer 60 is connected, on one side, to ground, and on the other side, to the movable tap of potentiometer 12 which itself is connected across primary winding 21. The output side of attenuator 70 is connected by a wire 71, through a blocking condenser 72, to an amplifier, generally indicated at 80. Attenuator output wire 71 is connected to the "start" S' of the primary of transformer 20. The output of amplifier 80 is applied across the primary winding 91 of a transformer, generally indicated at 90. The voltage appearing across secondary 92 of transformer 90 is applied to a phase detector, generally indicated at 100. The phase detector compares the bridge unbalance voltage from transformer 90 with a reference voltage from oscillator 10, which is supplied through lead 13 connected to center tap 93 of the secondary 92 of the transformer.

Across the primary of transformer 20, from start to finish thereof, there is connected a potentiometer 24. The movable tap of the potentiometer is connected through a resistor 25 to the center tap 33 of the secondary of transformer 20. A variable capacitor 26, and a fixed capacitor 27 in parallel therewith, are connected between the start of the primary of transformer 20 and the finish of the secondary.

The operation of the circuit of FIG. 1 will now be explained for the circumstance wherein differential pressure is the quantity or parameter being measured or detected. The high frequency output from oscillator 10 is appiled through transformer 20 to the bridge circuit 30. Differential pressure acting upon opposite sides of the foil 43 of transducer 40 causes a deflection of the foil toward one of the plates 41 or 42, and away from the other. The resulting change in capacitance creates an unbalance in the bridge 30, resulting in a voltage of amplitude determined by the magnitude of the pressure difference, between center tap 33 and ground. This signal is applied to pre-amplifier 50 which is preferably of the transistor type and is designed to have a very high input impedance to avoid loading the transducer impedance. The output of the pre-amplifier is supplied to attenuator 70 through the secondary of transformer 60 which provides a voltage which "bucks out" residual in-phase voltage unbalance from pre-amplifier 50. The attenuated signal is amplified by amplifier 80, which feeds the signal through transformer 90 to the phase detector 100. The detector furnishes a voltage of magnitude responsive to the magnitude of the bridge output of polarity dependent upon whether the output is in phase or 180° out of phase with respect to the oscillator voltage. The amplitude of the phase detector output voltage is indicated by meter 101 and is proportional to the differential pressure which produced the bridge unbalance.

With particular reference to transformer 20, it will be understood that a high distributed capacitance will exist between the "finish" F of the primary and the "start" S of the secondary, relative to distributed capacitance between the "start" S' of the primary and the "finish" F' of the secondary. In order to compensate for the unbalance of distributed capacitance, a capacitance balance or null balance adjustment is provided. This adjustment comprises capacitors 26 and 27 which are connected, in parallel, between the "start" S' of the primary and the "finish" F' of the secondary. Capacitor 27 is fixed, while the adjustment is provided by variation of capacitor 26.

Leakage between the primary and secondary of transformer 20 or any leakage to ground, disproportionate as between primary and secondary, will result in a quadrature component of unbalance in the bridge output. To correct this undesirable result of leakage, a portion of the primary voltage selected by the movable tap of potentiometer 24 is connected across the bridge output.

It has been pointed out that transformer 60 provides a bucking voltage bucking out residual in-phase or 180° out-of-phase bridge unbalance from pre-amplifier 50. In similar manner, the connection of the output circuit of the oscillator 10 to wire 71 provides a bucking voltage against undesirable quadrature voltage components induced in attenuator 70.

Having described a measuring and detecting device incorporating the transducer of the invention, as well as other novel circuit features, I will now describe in detail the novel features of my capacitor device forming, in the illustrative embodiment, a differential pressure transducer.

Figure 3:
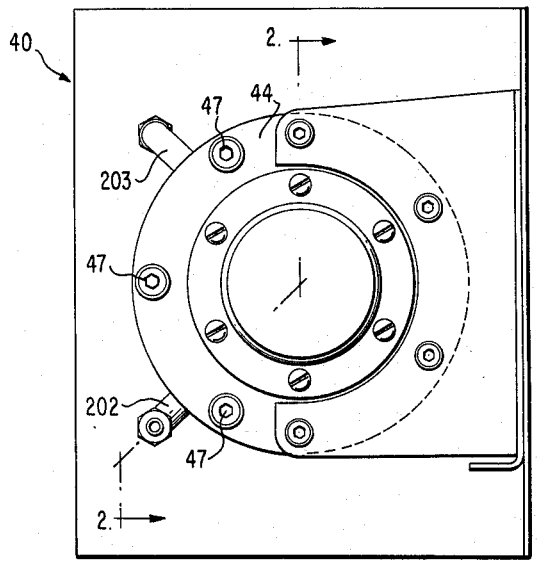
FIG. 3 is a side view of the differential capacitance transducer of a preferred embodiment of this invention.
Figure 2:
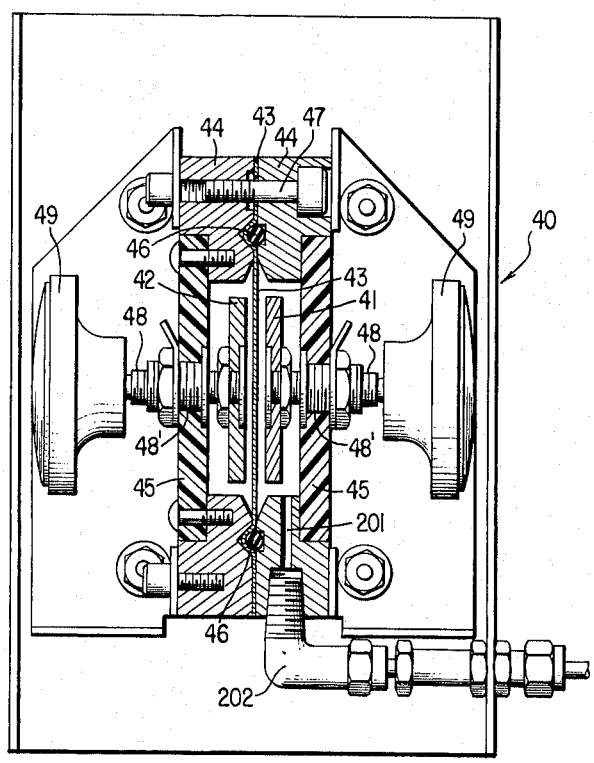
FIG. 2 is a sectional view taken along line 2—2 of FIG. 3.

With reference to FIGS. 2 and 3, there is generally indicated at 40 the capacitor device of this invention, having capacitor plates 41 and 42. Disposed between plates 41 and 42 there is a thin metallic web or foil 43. A pair of annular flanges 44 is arranged with the adjacent radial faces of the flanges in abutment with one another. The outer peripheries of flanges 44 define the outer cylindrical contour of the transducer, while the inner peripheries define the cylindrical wall housing the transducer device. End walls for the cylindrical housing are provided by covers 45 closing the opposite axial ends of the cylindrical housing. Retained between coinciding grooves in the abutting radial faces of flanges 44 is an O-ring 46 of compressible material.

Foil 43 extends between the outer peripheries of flanges 44. By the assembly of the flanges 44 into abutting relationship with the foil 43 and ring 46 disposed therebetween, foil 43 lies alongside ring 46 and is caused to be deformed so as to pass around ring 46. Flanges 44 and foil 43 are provided with holes to receive fastening means, such as bolts 47, by which the flanges are drawn together in tight abutting relationship. Since the foil extends from one periphery to the other of the flanges 44, the force exerted normal to the plane of the foil 43 and ring 46, the latter of which is slightly deformable, results in the placing of the foil 43 under tension. The tensile force thus produced in foil 43 causes it to return to its symmetrical plane coextensive with the abutting faces of flanges 44 after each deformation of the foil caused by differential pressure between the opposite sides thereof.

To assist in the exertion of force upon foil 43 through compression of ring 46 against it, it is preferable to form the annular groove in one of the flanges 44 of square U-shaped cross section, and to form the annular groove in the face of the other flange 44 of V-shaped cross section. The foil preferably lies on the side of ring 46 within the V-shaped groove. Thus, by means of the walls of the V-shaped groove, the foil is pressed upon ring 46 by force substantially perpendicular to a tangent thereto, thus avoiding penetration of the foil by the sharp corner of the U-shaped groove.

As best seen in FIG. 3, fastening means 47 which draws the adjacent flanges 44 tightly together, can be located about the cylindrical circumference of the flange body, so as to exert uniform pressure throughout the circumference of ring 46 and thus equal tension throughout foil 43.

Attached to condenser plates 41 and 42 are shafts 48 which extend through bushings 48' in covers 45. Shafts 48 and bushings 48' are cooperatively threaded by an extremely fine, micrometer thread. The remote or outer ends of shafts 48 are provided with handles 49. Thus, by means of handles 49, either of the plates 41 and 42 may be adjusted toward and away from foil 43 in a fine adjustment.

In capacitance devices of this type, and especially in the configuration heretofore described, it will be apparent that unequal expansion of any of the parts relative to the other parts will result in deleterious effects upon the accurate performance of the transducer. For example, considering that a fine micrometer adjustment of the position of plate 41 or 42 relative to foil 43 may be made, any uneven expansion or deformation of a cover 45, which carries the shaft 48, would result in displacement of plate 41 or 42 within the capacitance space. To obviate such problems, the materails comprising the constituent parts are chosen so as to have a substantially identical temperature coefficient. Flanges 44, foil 43, plates 41 and 42, and shafts 48 and 48' are preferably constructed of aluminum. Covers 45 are constructed of a phenolic resin having a temperature coefficient substantially equal to that of aluminum. Ring 46, being symmetrical, will be equally affected axially and about its entire circumference, so that its temperature coefficient will not be critical within reasonable limits. Thus, heat to which the capacitor parts are subjected will cause no uneven or asymmetrical expansion of the parts with consequent inaccuracy in the detection, measuring or other function of the transducer.

For adaptation of the transducer of this invention to sense differential pressure, as described in connection with FIG. 1, the interior capacitance space is subjected to pressure different on one side of the foil from that on the other. For that purpose, a passage 201 is provided through one of the flanges 44 so as to enter the capacitor space within the flange. Connecting with passage 201 is a suitable pipe or conduit 202, which may be connected to any desired source of pressure to be measured or detected. As best shown in FIG. 3, a pipe or conduit 203 connects with a passage, not shown, entering the space opposite the foil 43 from that with which passage 201 connects.

While the adaptation of the transducer has been set forth in the particular detecting device of FIG. 1, it should be understood that the transducer may have utility in a number of other and varied applications. For example, since the foil 43 is grounded, it is possible to apply, to one of the capacitor plates 41 or 42, a high frequency voltage, and to the other plate a high frequency voltage of either the same or different frequency. Across the terminals of the transducer, then, may be taken a "difference frequency" which may be transmitted in various applications having great utility, such as in the art of telemetering.

From the foregoing, it is apparent that the invention thus described provides a transducer which is rugged, simple, reliable, and adaptable to a number of useful applications. When incorporated in a bridge circuit of the type described, it can be used to sense differential pressure and thus indicate change in pressure by generating a signal responsive to unbalance in the bridge circuit. In this use of the transducer, various problems arise in adapting the transducer to the particular circuit; however, these problems have been overcome by the novel circuit features described above.

Although the foregoing embodiment has been illustrated and described, it is apparent to those skilled in the art that various changes and modifications may be made in the construction arrangements of the various parts without departing from the scope of the invention; I therefore do not wish to be limited to the specific embodiments shown or suggested, but only by the scope of the limitations which follow.

What I claim as new and desire to secure by Letters Patent of the United States is:

1. An electrical capacitor device comprising
    a pair of capacitor plates arranged parallel to each other,
    a thin metallic foil parallel to and disposed between said plates,
    a pair of annular flanges having parallel faces opposite each other with said foil therebetween,
    and means in contact with the foil for stretching it while clamping it between the flanges, said means comprising surfaces on at least one of said flange faces defining an annular groove therein,
    a ring lying partially in said groove, said foil being of such size as to overlie said ring and groove so as to be stretched when the flanges are clamped together,
    and means for fastening said flanges together to clamp the foil between the flanges after stretching the foil between said ring and groove.

2. The apparatus of claim 1 in which said ring is an O-ring of compressible material.

3. An electrical capacitor device comprising
    a pair of capacitor plates arranged parallel to each other,
    a thin metallic foil parallel to and disposed between said plates,
    a pair of annular flanges having parallel faces opposite each other with said foil therebetween,
    one of said flange faces having a U-shaped annular groove and the other flange face having a V-shaped annular groove therein with the grooves opposite each other,
    an O-ring of compressible material lying in both of said grooves with the foil between the ring and said V-shaped groove,
    and means for fastening said flanges together to clamp the foil between the flanges after stretching the foil between said ring and V-shaped groove.

4. The apparatus of claim 3 in which said fastening means includes a plurality of bolts passing through one of said flanges and threaded into the other flange.

5. A capacitive transducer for sensing the pressure difference between two fluids comprising
    a pair of capacitor plates arranged parallel to each other,
    a thin metallic foil parallel to and disposed between said plates,
    a pair of annular flanges having parallel faces opposite each other with said foil therebetween,
    one of said flange faces having a U-shaped annular groove and the other flange face having a V-shaped annular groove therein, with the grooves opposite each other,
    an O-ring of compressible material lying in both of said grooves with the foil between the ring and said V-shaped groove,
    means for fastening said flanges together to clamp the foil between the flanges stretching the foil between said ring and V-shaped groove,
    a pair of covers parallel to and arranged at opposite sides of said pair of capacitor plates to define, with said flanges and foil, a pair of chambers separated by the foil,
    and means for supplying said two fluids to different ones of said chambers.

6. The apparatus of claim 5 including
    two micrometer screw threaded shafts respectively fixed to and extending perpendicularly from the remote sides of different ones of said capacitor plates,
    said covers having micrometer screw threaded bushings through which said shafts extend,
    and handle means fixed to said shafts,
    whereby the capacitor plates may be moved toward and away from said foil.

References Cited by the Examiner
UNITED STATES PATENTS

| | | | |
|---|---|---|---|
| 2,667,786 | 2/1954 | Spaulding | 317—246 X |
| 2,751,530 | 6/1956 | Armstrong | 317—246 |
| 2,907,320 | 10/1959 | Weese | 317—246 X |

ROBERT K. SCHAEFER, *Acting Primary Examiner.*

LARAMIE E. ASKIN, JOHN F. BURNS, *Examiners.*